(12) United States Patent
Groussard et al.

(10) Patent No.: US 10,767,580 B2
(45) Date of Patent: Sep. 8, 2020

(54) METHOD FOR CHECKING A PRESSURE MEASUREMENT IN A FUEL TANK

(71) Applicants: Continental Automotive France, Toulouse (FR); Continental Automotive GmbH, Hannover (DE)

(72) Inventors: Aurélien Groussard, Toulouse (FR); Thierry Collet, Fontenilles (FR)

(73) Assignees: Continental Automotive France (FR); Continental Automotive GmbH (DE)

(*) Notice: Subject to any disclaimer, the term of this patent is extended or adjusted under 35 U.S.C. 154(b) by 0 days.

(21) Appl. No.: 16/311,920

(22) PCT Filed: Jun. 30, 2017

(86) PCT No.: PCT/FR2017/051765
§ 371 (c)(1),
(2) Date: Dec. 20, 2018

(87) PCT Pub. No.: WO2018/002550
PCT Pub. Date: Jan. 4, 2018

(65) Prior Publication Data
US 2019/0178177 A1    Jun. 13, 2019

(30) Foreign Application Priority Data
Jun. 30, 2016  (FR) ..................... 16 56200

(51) Int. Cl.
*B60K 15/035*  (2006.01)
*F02M 25/08*  (2006.01)
(Continued)

(52) U.S. Cl.
CPC .... *F02D 41/0032* (2013.01); *B60K 15/03519* (2013.01); *F02D 33/003* (2013.01);
(Continued)

(58) Field of Classification Search
CPC .... F02D 41/0032; F02D 41/22; F02D 41/222; F02D 41/0037; F02D 2041/224; F02D 33/003; B60K 15/03519; F02M 37/0012; F02M 25/0836; F02M 25/0809; F02M 25/0872; F02M 25/0854
See application file for complete search history.

(56) References Cited

U.S. PATENT DOCUMENTS 10,385,795 B2 * 8/2019 Dudar ............... F02D 41/222
2006/0142931 A1 * 6/2006 Cho .................. G01L 27/007
701/114
(Continued)

FOREIGN PATENT DOCUMENTS

DE         10138379 A1    3/2002
DE     102010040880 A1    4/2011
(Continued)

OTHER PUBLICATIONS

International Search Report and Written Opinion for International Application No. PCT/FR2017/051765, dated Sep. 27, 2017—7 pages.

*Primary Examiner* — George C Jin
(74) *Attorney, Agent, or Firm* — RatnerPrestia

(57) ABSTRACT

A method for checking a measurement of pressure in a fuel tank, implemented in a vehicle having a fuel tank and a fuel vapor breather circuit including: a filter, a tank isolation valve interposed between the tank and the filter, and a purge line, connected to the filter, downstream thereof, a pressure sensor, and a purge valve. The method includes, when the purge valve is closed: measuring a value of the pressure in the tank when the isolation valve is closed, then measuring a temporal extreme value for the pressure in the purge line following an opening of the isolation valve, and determining, from the measured values, that there is an anomaly in the measured pressure in the tank.

10 Claims, 4 Drawing Sheets

(51) Int. Cl.
*F02D 41/00* (2006.01)
*F02M 37/00* (2006.01)
*F02D 33/00* (2006.01)
*F02D 41/22* (2006.01)
*B60K 15/03* (2006.01)
*F02D 29/02* (2006.01)

(52) U.S. Cl.
CPC ......... *F02D 41/22* (2013.01); *F02M 25/0836* (2013.01); *F02M 37/0082* (2013.01); *B60K 2015/0321* (2013.01); *B60K 2015/03197* (2013.01); *B60K 2015/03514* (2013.01); *B60K 2015/03571* (2013.01); *B60K 2015/03585* (2013.01); *B60Y 2200/92* (2013.01); *F02D 29/02* (2013.01); *F02D 41/003* (2013.01); *F02D 2041/223* (2013.01); *F02D 2200/0602* (2013.01)

(56) References Cited

U.S. PATENT DOCUMENTS

| | | |
|---|---|---|
| 2011/0079201 A1 | 4/2011 | Peters et al. |
| 2011/0295482 A1* | 12/2011 | Pearce ............. B60K 15/03504 701/102 |
| 2015/0075501 A1* | 3/2015 | Peters ................ F02M 25/0854 123/520 |
| 2015/0322902 A1* | 11/2015 | Akita ................ F02M 25/0809 123/519 |
| 2018/0088603 A1* | 3/2018 | Groussard ............. G05D 16/02 |

FOREIGN PATENT DOCUMENTS

| | | |
|---|---|---|
| KR | 20020051776 A | 6/2002 |
| KR | 20020053111 A | 7/2002 |
| KR | 20100046490 A | 5/2010 |
| KR | 101261174 B1 | 5/2013 |

* cited by examiner

METHOD FOR CHECKING A PRESSURE MEASUREMENT IN A FUEL TANK

CROSS REFERENCE TO RELATED APPLICATIONS

This application is the U.S. National Phase Application of PCT International Application No. PCT/FR2017/051765, filed Jun. 30, 2017, which claims priority to French Patent Application No. 1656200, filed Jun. 30, 2016 the contents of such applications being incorporated by reference herein.

FIELD OF THE INVENTION

The invention relates to a method for checking a measurement of pressure in a fuel tank, and to a device for performing said correction.

The invention notably relates to the checking of the measurement of pressure in a fuel tank of a combustion engine and notably an internal combustion engine of the gasoline type.

BACKGROUND OF THE INVENTION

In a vehicle comprising an internal combustion engine and a fuel tank supplying the engine, it is known practice to provide a breather circuit that removes fuel vapors that may emanate from the fuel tank.

Such a fuel vapor breather circuit conventionally comprises a vapor purge line at the fuel tank connecting the fuel tank to the intake side of the engine.

The fuel vapor breather circuit also comprises means for collecting fuel vapors in the fuel tank and, in particular, a fuel vapor filter, commonly referred to as a "canister", which is conventionally an active-carbon filter and which is interposed between the fuel tank and the vapor purge line. It therefore allows fuel vapors emanating from the tank to be collected, particularly when the engine is not running.

The filter is also connected to an air intake so that when the engine is running, a depression in the feed line causes air to circulate through the filter and purge the fuel vapors it contains, removing them toward the engine.

However, in certain vehicles such as hybrid motor vehicles equipped with a combustion engine and an electric motor, the combustion engine running time may be short and not long enough to purge the gasoline vapors stored in the filter. In order to prevent the fuel vapors from escaping from the fuel tank and thus filling the filter, it is known practice to position, on a line connecting the tank to the filter, a valve referred to as the tank isolation valve. This line can be opened or closed selectively in order to allow or prevent the circulation of fluid in the line, and notably to prevent vapors from leaving the tank.

The fuel tank is therefore dimensioned to withstand a higher pressure than in vehicles that do not have such an isolation valve. The pressure in the fuel tank is measured by a dedicated sensor positioned in the tank.

Now, because the components such as the fuel vapor filter, the isolation valve, and the in-tank pressure sensor have the role of limiting the emission of fuel vapors to the environment, and therefore the pollution emitted by the vehicle, these components are subject to specific legal requirements, and notably to a permanent check that they are operating correctly.

Certain checks on the in-tank pressure sensor already exist, namely an electrical diagnosis and a verification that the pressure value measured by the sensor does not lie outside of a plausible range of values. Nevertheless, there is not at this stage any verification as to the consistency of the sensor measurement, which makes it possible to determine an anomaly in this measurement if this measurement does not extend outside of a plausible range. For example, anomalies such as a sensor drift error or a blocking of the sensor value cannot be detected.

SUMMARY OF THE INVENTION

Given the foregoing, an aspect of the invention aims to alleviate the shortfalls of the prior art by providing a means for checking the measurement, taken by a pressure sensor, of the pressure in a fuel tank.

In particular, an aspect of the invention aims to make it possible to detect an anomaly in the pressure measurement.

Another aspect of the invention aims to make it possible, by checking the measurement of the pressure in the fuel tank, to detect other types of anomaly in the fuel vapor breather circuit of a combustion engine.

In this respect, one aspect of the invention is a method for checking a measurement of pressure in a fuel tank, the method being implemented in a vehicle comprising a fuel tank comprising a pressure sensor and a tank fuel vapor breather circuit comprising:
- a fuel vapor filter,
- a fuel tank isolation valve interposed between the fuel tank and the filter, and
- a fuel vapor purge line, connected to the filter, downstream thereof, and comprising a sensor of pressure in the line, and a purge valve designed to selectively allow or prevent circulation of fluid in the purge line, the method being characterized in that it comprises the steps, when the purge valve is closed, of:
- measuring a value of the pressure in the fuel tank when the tank isolation valve is closed, then
- measuring a temporal extreme value for the pressure in the purge line following an opening of the isolation valve, and
- determining, from the two pressure values measured, the presence of an anomaly in the measured value for the pressure in the fuel tank.

Advantageously, but optionally, the checking method according to an aspect of the invention may further comprise at least one of the following features:
- the determining step involves comparing the temporal extreme value for the pressure in the purge line against a reference extreme value corresponding to the same value for the fuel tank pressure before the opening of the valve.
- the method may comprise a preliminary step of establishing a relationship between the temporal extreme value for the pressure in the purge line after the opening of the tank isolation valve and the pressure in the tank before the opening of the valve.
- the relationship may be established by interpolation from a collection of recorded temporal extreme values for the pressure in the purge line after the opening of the isolation valve for different values of the pressure in the tank before the opening of the valve.
- the relationship may be established on the basis of at least ten records.
- if a difference between the temporal extreme value for the pressure measured in the line and a reference extreme value for the same pressure in the tank before the opening of the valve exceeds a determined tolerance threshold, then the pressure value measured in the fuel tank is determined as exhibiting an anomaly.

Another aspect of the invention is a computer program product, characterized in that it comprises code instructions for implementing steps consisting in:

operating a pressure sensor so as to measure a value of the pressure in a fuel tank when a fuel tank isolation valve and a fuel vapor purge line purge valve are closed, when the purge line is placed in fluidic communication with the fuel tank by the opening of the fuel tank isolation valve, operating a sensor of pressure in the line so as to measure a temporal extreme value for the pressure in the line, and comparing said measurements against a reference, and on the basis of the result of said comparison, determining whether the value for the pressure measured in the fuel tank exhibits an anomaly, when implemented by a processor.

Another aspect of the invention relates to a device for checking the measurement of pressure in a fuel tank, the checking device comprising at least one checker communicating with a sensor of pressure in the fuel tank and with a sensor of pressure in a fuel vapor purge line, characterized in that the checker is designed to implement the method according to the foregoing description.

Another aspect of the invention relates to a motor vehicle comprising:

a combustion engine, a fuel tank comprising a pressure sensor, a fuel vapor breather circuit comprising:

a fuel vapor filter, a fuel tank isolation valve interposed between the tank and the filter, a fuel vapor purge line, connected to the filter, downstream thereof, and comprising a sensor of pressure in the line, and a purge valve designed to selectively allow or prevent circulation of fluid in the purge line, characterized in that it further comprises a checking device according to the foregoing description.

An aspect of the invention proposed makes it possible to determine an anomaly in a measurement from a pressure sensor by corroborating this measurement against that of a sensor of pressure in the purge line.

BRIEF DESCRIPTION OF THE DRAWINGS

Other features, aims and advantages of aspects of the present invention will become apparent upon reading the detailed description that will follow and upon examining the appended figures, given by way of nonlimiting example and in which.

DETAILED DESCRIPTION OF THE PREFERRED EMBODIMENTS

Figure 1:
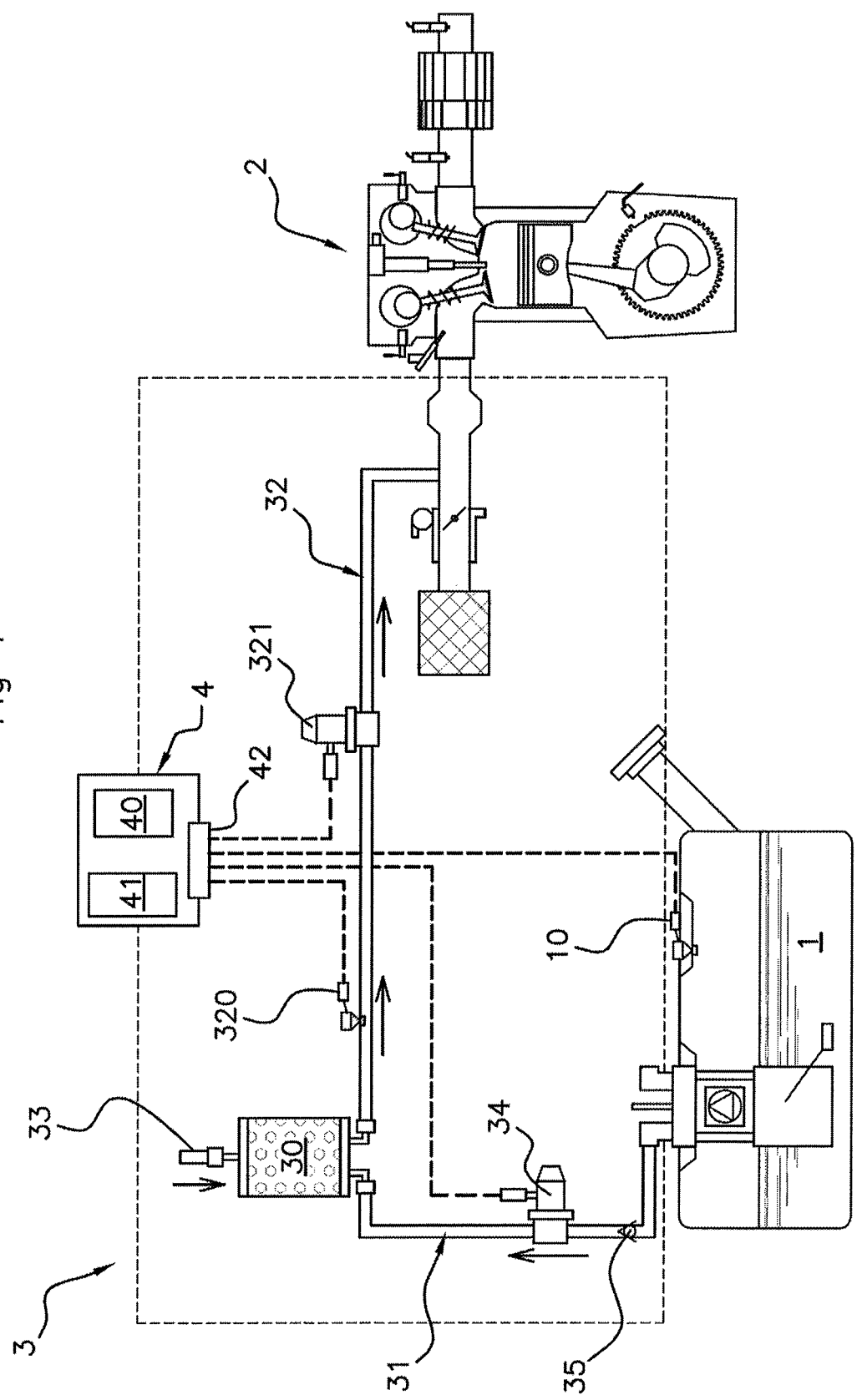
FIG. 1 depicts a partial schematic view of a vehicle comprising a combustion engine, a fuel tank to feed the engine, and a breather circuit for removing the fuel vapors emanating from the tank.

Reference is made to FIG. 1, which depicts a subassembly of a motor vehicle comprising a fuel tank 1, a combustion engine 2, typically an internal combustion engine, notably of the gasoline type, a breather circuit 3 for removing fuel vapors emanating from the fuel tank, to the engine 2, and a checking device 4.

The fuel tank 1 comprises a pressure sensor 10 located inside it and designed to measure a pressure in the fuel tank. The pressure in the tank is the result of the air and fuel vapors contained in the tank.

The breather circuit 3 comprises a fuel vapor filter 30, for example an active carbon filter, designed to filter the fuel vapors escaping from the fuel tank 1. The fuel vapor filter 30 is connected to the fuel tank 1 by a first line 31 upstream of the filter 30 and to the intake side of the engine 2 by a second line 32, referred to as the fuel vapor purge line, downstream of the filter 30.

The filter 30 comprises an air intake 33 making it possible, when there is a depression in the engine while same is running, to circulate a flow of air through the filter, which becomes purged of the fuel vapors stored therein, and which is then discharged to the intake side of the engine via the line 32.

The vapor purge line 32 comprises a pressure sensor 320 and a purge valve 321 (also known as the CPS which stands for "Canister Purge Solenoid"), which makes it possible to regulate the flow rate of fuel vapor laden air circulating between the filter 30 and the intake side of the engine 2.

The vapor breather circuit 3 further comprises a fuel tank isolation valve 34 (also known as an FTIV), which is interposed between the fuel tank 1 and the filter 30, on the first line 31, and which by opening or closing makes it possible selectively to allow or to prevent the circulation of fuel vapors from the tank toward the filter 30.

Typically, the isolation valve 34 is closed by default, and is commanded to open at specific isolated moments, for example when the fuel tank is being filled. The vapors contained in the tank then escape into the line 31 toward the fuel vapor filter 30.

The circuit also comprises a valve 35 known as the Roll-Over Valve (or ROV) which, in the event of an accident, makes it possible to prevent fuel from escaping from the tank if the vehicle rolls over.

Finally, the checking device 4 comprises a computer 40 comprising processing means such as a processor or a microprocessor, a controller or a microcontroller, or alternatively an integrated circuit for example of the ASIC or programmable type, etc. The computer is designed to execute code instructions allowing it to implement the checking method described hereinbelow. The checking device 4 further comprises a memory 41 and at least one communication interface 42 for communicating with the sensor 10 of pressure in the tank, the sensor 320 of pressure in the purge line, the isolation valve 34 and the purge valve 321.

The checking device 4 is designed to record the measurements from the pressure sensors and, optionally, to be aware that the valves are in the open state and/or command the valves into the open state.

Figure 2:
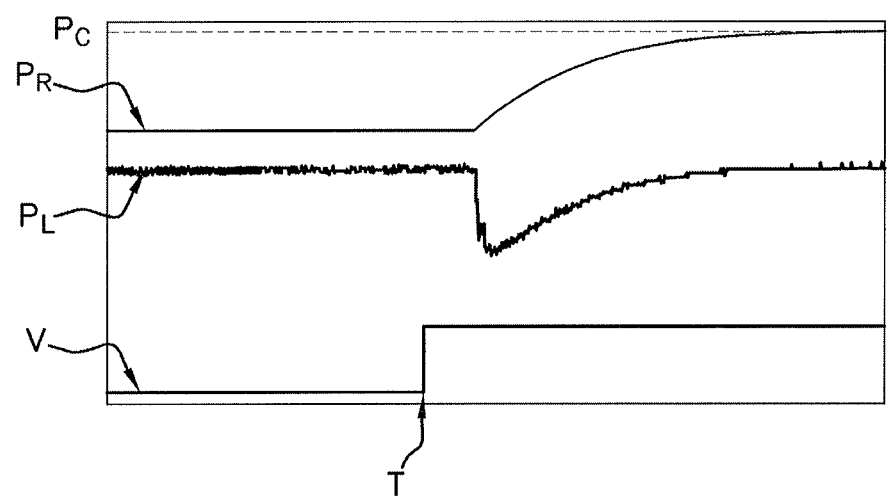
FIG. 2 depicts an example of the way in which the pressure in the fuel tank and in the filter purge line evolve with respect to time when the isolation valve is opened.

Reference is made to FIG. 2 which depicts a way in which the pressures in the fuel tank 1 and in the vapor purge line 32 evolve when the isolation valve 34 is opened. The command as to whether the isolation valve 34 is in the open or closed state is indicated by the curve V. Initially on the graph, the isolation valve is closed, and a command to open the valve 34 occurs at the time T indicated on the graph.

The purge valve 321 is closed throughout the entire period of time indicated on the graph, which ensures that the pressure in the purge line 32 does not fluctuate as a result of the operation of the engine located downstream.

Curve $P_R$ represents the pressure in the fuel tank, whereas curve $P_L$ represents the pressure in the vapor purge line 32.

When the vapor isolation valve 34 is closed, before the time T, the pressure in the tank and the pressure in the purge line 32 are constant and independent because there is no circulation of fuel vapors in the breather circuit and neither is there any variation in pressure.

The pressure in the purge line 32 is equal to atmospheric pressure because the line is in communication with the outside via the air intake 33 of the filter 30.

The pressure in the fuel tank is constant and equal to a value which may be higher or lower than atmospheric pressure, depending on the type of fuel, on the ambient temperature, etc.

The opening of the isolation valve 34 causes the pressure in the fuel tank to vary until it reaches a setpoint pressure $P_c$, controlled for example by the computer 40. The setpoint pressure may be equal to atmospheric pressure. As an alternative, the setpoint pressure may be a pressure comprised between the initial pressure in the fuel tank and atmospheric pressure. In that case, the computer 40 controls the isolation valve 34 so as to close it again after a determined interval of time corresponding to the time needed to reach the setpoint pressure. This makes it possible to empty the fuel tank of vapors only in part so as to avoid saturating the filter 30 in a single opening of the valve 34.

In the example of FIG. 2, only an opening of the isolation valve 34 is provided and the setpoint pressure is equal to atmospheric pressure. The scales of curves $P_L$ and $P_R$ are different.

If the fuel tank is initially at a raised pressure with respect to atmospheric pressure, due to a buildup of fuel vapors, the opening of the valve places the tank in fluidic communication with the line 31 at atmospheric pressure, and this causes the pressure in the tank to drop progressively until the setpoint pressure is reached.

The fuel tank 1 may equally initially be experiencing a depression, as is the case in FIG. 2. This is what happens for example if, between a closing and a subsequent opening of the isolation valve, the temperature in the tank is dropped, causing the fuel vapors to condense. In that case, the opening of the valve 34 causes the pressure in the fuel tank to increase until the setpoint pressure is reached.

The equalizing of the pressure in the tank, which means to say the act of reaching the setpoint pressure, occurs in the seconds following the opening of the valve, for example in under 10 seconds after the opening of the valve.

Moreover, it can be seen from curve $P_L$ that the opening of the valve 34 also causes, in the purge line, a temporary variation in pressure about atmospheric pressure, as a result of the establishment of the flow of vapors being removed upon the opening of the FTIV valve 34.

Thus, for example, if the tank is initially at a raised pressure, the opening of the valve 34 causes the pressure in the tank to decrease and creates a temporary overpressure wave in the line 32. In the opposite scenario depicted in FIG. 2, where the tank is initially experiencing a depression, the opening of the valve 34 causes the pressure in the tank to increase and creates a temporary depression wave in the line 32.

It may therefore be seen that the opening of the valve causes a temporary variation in pressure to appear in the purge line 32, which variation comprises, in succession, either a reduction followed by an increase, or an increase followed by a reduction. It is therefore possible to determine a spike, or temporal extreme, for the pressure in the line 32 following the opening of the valve, and to measure the value of the pressure at the spike.

This temporary variation in pressure occurs in the seconds following the opening of the valve, typically in the first 10 or even in the first 5 seconds after opening.

Now, the Applicant Company has found that the value of this temporal extreme pressure in the line is dependent on the pressure in the fuel tank before the opening of the valve 34. Specifically, the greater the initial raised pressure (or depression) in the tank 1 with respect to atmospheric pressure, the stronger the pressure wave in the line 32.

Figure 3:
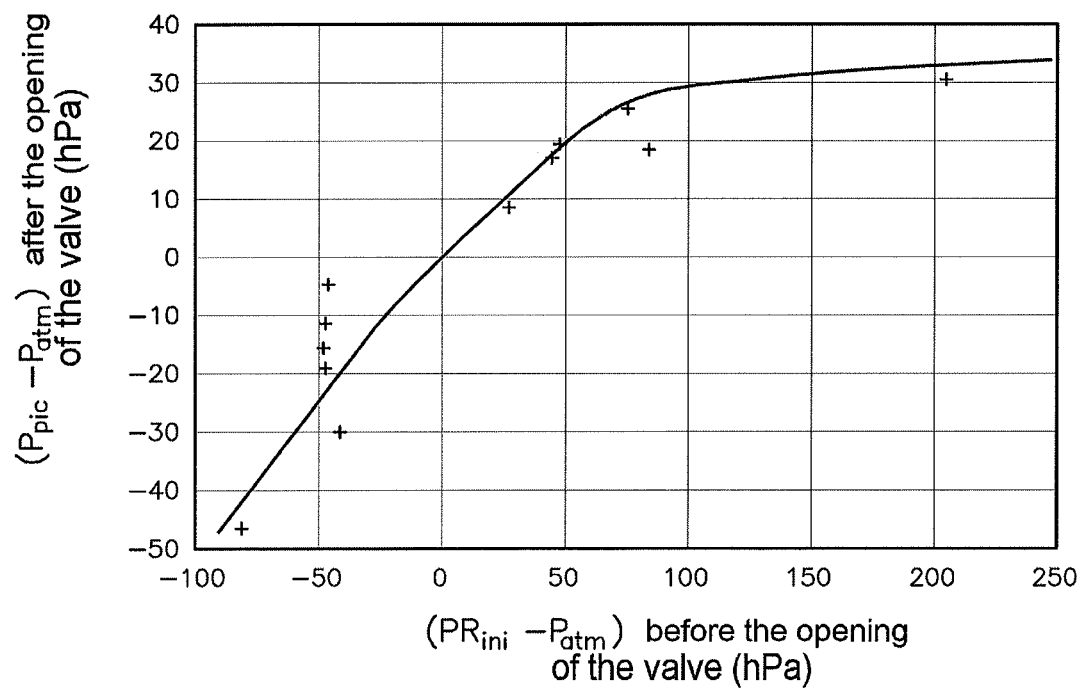
FIG. 3 depicts one example of a relationship between the temporal extreme value for the pressure in the purge line after the opening of the isolation valve and the value of the pressure in the tank before this opening, FIG. 4 schematically depicts the key steps in a method for checking the measurement of tank pressure.

As a result, with reference to FIG. 3, it is possible to establish a relationship between the pressure in the fuel tank before the opening of the valve 34, and the value of the extreme pressure in the line 32 following the opening of the valve. In FIG. 3, the difference between the pressure in the tank $PR_{ini}$ before the opening of the valve and atmospheric pressure $P_{atm}$ is represented, in hectopascals, on the abscissa axis. The difference between the extreme pressure $P_{plc}$ in the line 32 and atmospheric pressure $P_{atm}$ after the opening of the valve is represented, in hectopascals, on the ordinate axis.

This relationship is dependent on the components of the fuel breather circuit and notably on the characteristics of the fuel vapor filter 30. It may therefore be established for a set of identical vehicles, equipped with the same fuel breather circuit, notably with the same model of filter 30 and the same model of tank.

The measurement of the pressure in the line 32, taken by the pressure sensor 320, is considered to be reliable because this sensor is already subject to a check not covered in the present application. As a result, it is possible to make use of the measurement from the pressure sensor 320 in order to verify the measurement taken by the sensor 10 in the fuel tank, on the basis of the relationship established hereinabove.

Figure 4:
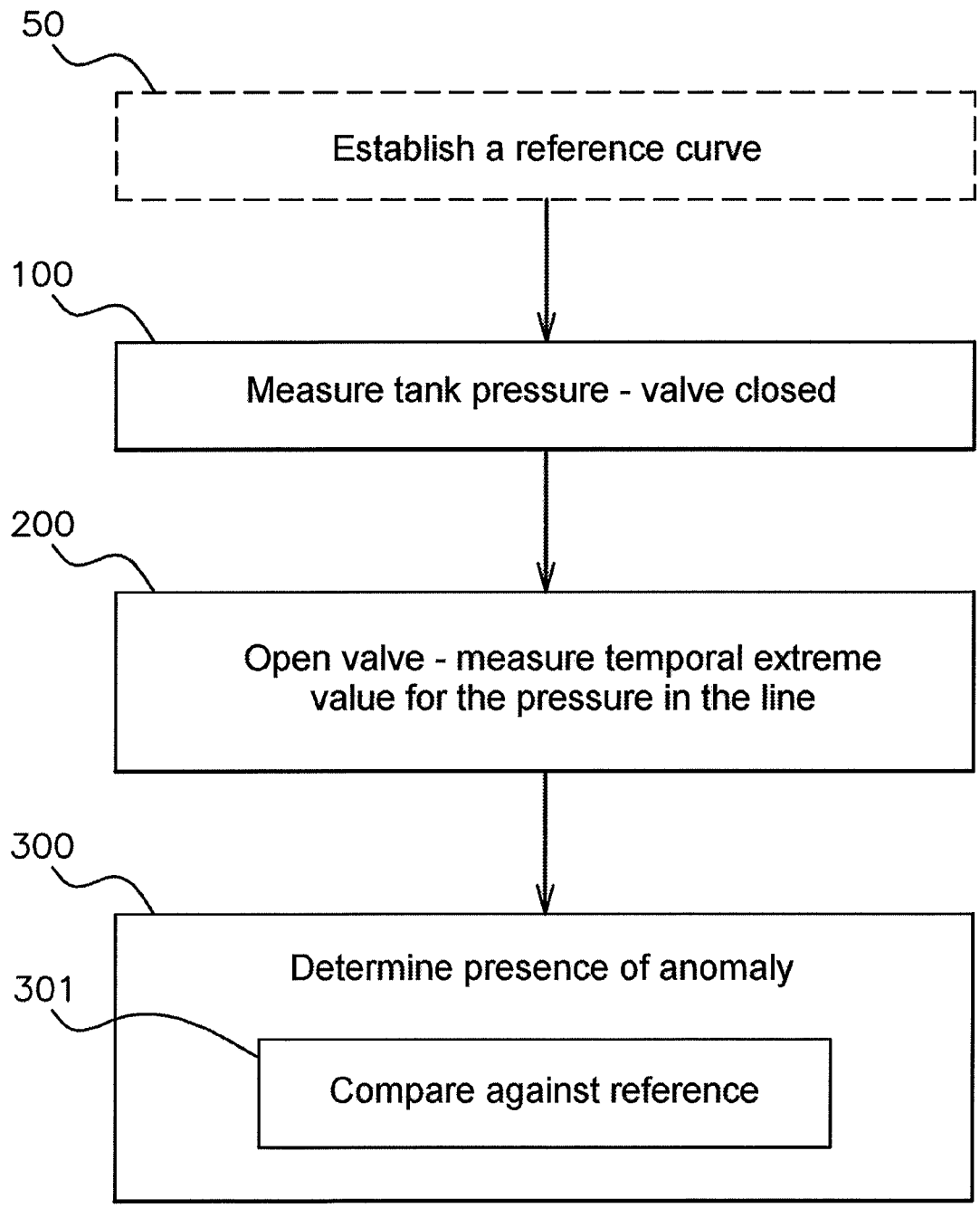
Figure 5:
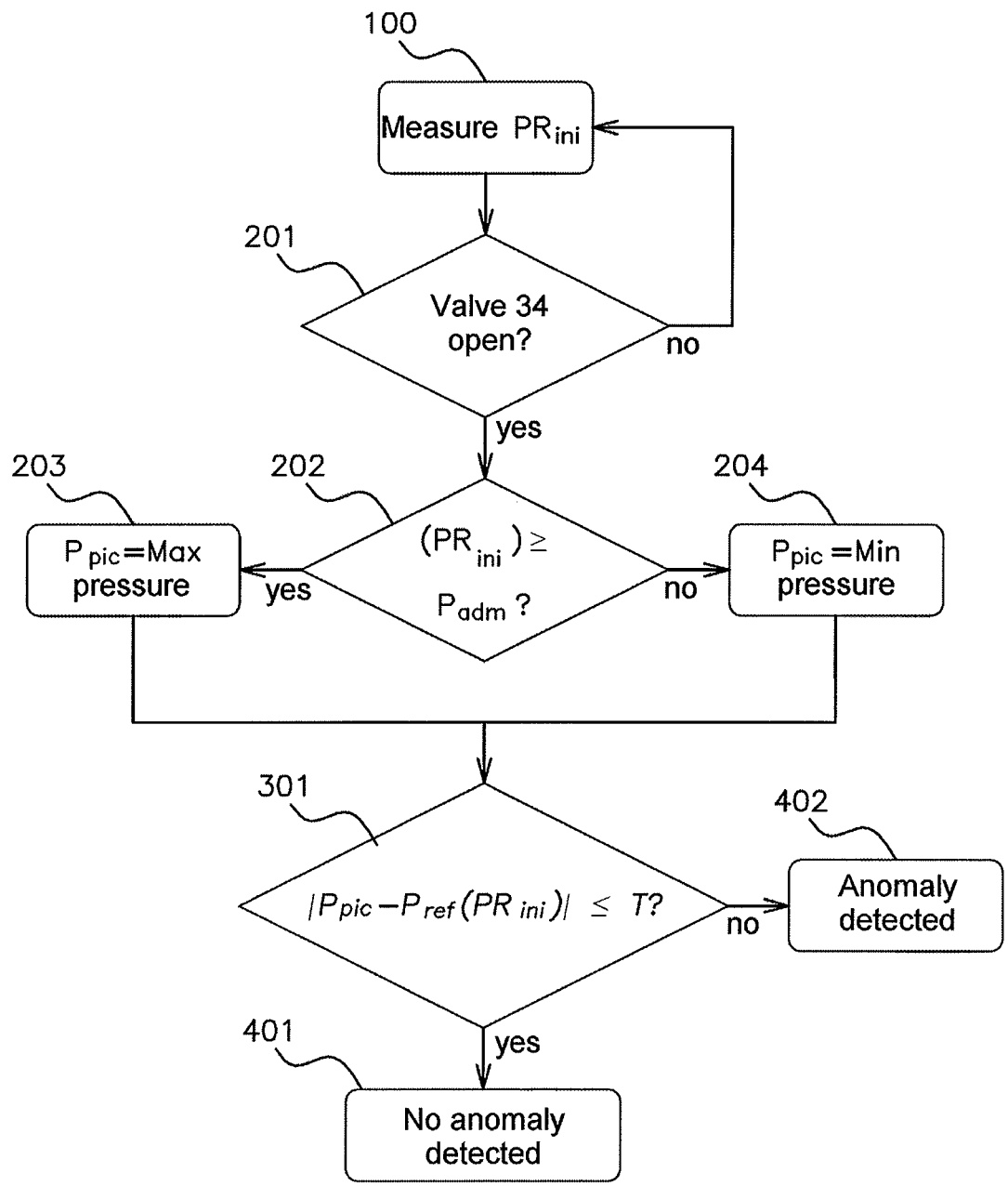
FIG. 5 depicts one exemplary implementation of the method according to one embodiment of the invention.

Reference is made to FIGS. 4 and 5 which depict a method for checking the measurement of the pressure in the fuel tank. This method is implemented by the checking device 4 described hereinabove, when the purge valve 321 of the line 32 is closed, so as to guarantee that the pressure in the purge line 32 is constant and equal to atmospheric pressure.

The method may be implemented at the time of an already-scheduled closing of the purge valve 321, for example when the engine fuel injection system is undergoing adjustment. As an alternative, the checking device 4 may operate the valve 321 so as to close it so that the method can be implemented.

The method comprises a first step 100 of measuring the pressure in the fuel tank 1 using the pressure sensor 10 controlled by the checking device 4. This step is implemented when the tank isolation valve 34 is closed. As can be seen in FIG. 5, it may advantageously be implemented constantly for all of the time that the isolation valve is closed. In FIG. 5, $PR_{ini}$ denotes the measured value for the pressure in the fuel tank.

The method then comprises a step 200 of measuring, following the opening of the isolation valve 34, of a value for the pressure in the purge line 32 corresponding to a temporal extreme value for the pressure in the line, which means to say the minimum or maximum value for the pressure in the line following the opening of the valve. The measurement is performed by the pressure sensor 320 in the line 32, controlled to do so by the checking device 4.

This step 200 may advantageously comprise the commanding, by the checking device 4, of the opening of the valve so as to anticipate the variation in pressure in the line, or simply the detection of the opening of the valve 34, following which the checking device 4 commands the sensor 320 to monitor the pressure in the line 32 in order to be able to detect the extreme pressure value.

In FIG. 5, the opening of the valve, whether detected or commanded, is denoted 201.

The detection of the extreme pressure value advantageously involves making a comparison 202 between the pressure value $PR_{ini}$ measured in the fuel tank, and atmospheric pressure.

If the pressure value measured by the pressure sensor 10 before the opening of the valve 34 was higher than atmospheric pressure, then the checking device 4 during a step 203 determines the temporal maximum for the pressure in the line 32. If the pressure value measured by the sensor 10 in the tank before the opening of the valve 34 was lower than atmospheric pressure, then the checking device during a step 204 determines a temporal minimum for the pressure in the line 32.

The extreme value for the pressure measured in the purge line 32 is denoted $P_{pic}$.

The method then comprises a step 300 during which the checking device 4 determines, from the pressure measurements taken in steps 100 and 200, whether the value of fuel tank pressure as measured by the sensor 10 presents an anomaly. This step is implemented by comparing (step 301) the measured extreme pressure value against a reference value corresponding to the same initial value for the pressure in the fuel tank.

The reference value is obtained by establishing a relationship (one example of which is depicted in FIG. 3) between the extreme value for the pressure in the line after the opening of the valve and the value for the pressure in the fuel tank before this opening. The relationship can be established by the checking device during a preliminary step 50. Alternatively, it may have been established beforehand by a separate processing system, possibly on the basis of measurements taken on another vehicle identical to the one in which the method is implemented. The relationship is then loaded into the memory of the checking device 4.

The relationship is established by performing, in a vehicle determined as healthy, and the purge valve 321 of which is closed, a set of sequences involving:
  measuring the pressure in the fuel tank with the valve 34 in the closed state,
  opening the valve and measuring the extreme value for the pressure in the line 32.

For preference, several extreme-pressure values are acquired for each initial pressure in the fuel tank. In addition, extreme-pressure values are recorded for several values of initial pressure in the fuel tank.

In total, at least 10 extreme-pressure readings are recorded, these being spread over at least 2 to 3 values for the initial pressure in the fuel tank, and for preference at least 2 to 3 extreme-pressure values are measured for each value of the initial pressure in the fuel tank.

The extreme-pressure values are then interpolated in order to obtain, for each possible value of the pressure in the tank, a corresponding value for the extreme of pressure in the purge line.

Returning to FIGS. 4 and 5, the comparison between the measured extreme-pressure value and the reference value is advantageously performed with a tolerance, which may, for example, although nonlimitingly, be comprised between 5 and 10% of the expected reference value.

According to a first embodiment, the comparison can be made visually by transferring the measurement point obtained in steps 100 and 200 onto a curve consistent with the example of FIG. 3, which represents the value of the extreme of pressure in the line 32 as a function of the initial pressure in the fuel tank. A tolerance band is then advantageously indicated on the same graph so as to be able to determine visually whether the measured extreme-pressure value lies within the tolerance band.

As an alternative, as depicted in FIG. 5, this comparison is implemented as follows, denoting the reference extreme value corresponding to the pressure value measured in the fuel tank as $P_{ref}(PR_{ini})$:

$$|P_{pic} - P_{ref}(PR_{ini})| \leq T$$

where $T = a \cdot P_{ref}(PR_{ini})/100$ and a gives the percentage corresponding to the tolerance, for example a=10 for a tolerance of 10%.

If the measured extreme-pressure value is consistent with the reference value within the tolerance, then during a step 401, the pressure value $PR_{ini}$, measured by the pressure sensor 10 in step 100 is considered to be normal. If not, an anomaly is detected in a step 402. This anomaly may be the result of a malfunctioning of the sensor 10, but may also be caused by a problem in the line 31 or the filter 30 between the fuel tank 1 and the pressure sensor 320 in the purge line 32. For example, a problem in the line 31 may result in a greater drop in pressure head of the fuel vapor laden air circulating in the line, which will alter the measured extreme-pressure value.

The method proposed therefore makes it possible to exploit the values provided by the pressure sensor 320 in the line, which sensor is considered to be reliable because it is subject to monitoring elsewhere, to check the value of the fuel tank pressure as measured by the sensor 10. This notably makes it possible to monitor the operation of this sensor.

The invention claimed is:

1. A method for checking a measurement of pressure in a fuel tank, the method being implemented in a vehicle comprising a fuel tank comprising a pressure sensor and a tank fuel vapor breather circuit comprising:
  a fuel vapor filter,
  a fuel tank isolation valve interposed between the fuel tank and the filter, and
  a fuel vapor purge line, connected to the filter, downstream thereof, and comprising a sensor of pressure in the purge line, and a purge valve designed to selectively allow or prevent circulation of fluid in the purge line,
  the method comprising, when the purge valve is closed, of:
    measuring a value of a pressure in the fuel tank when the tank isolation valve is closed,
    measuring a temporal extreme value for the pressure in the purge line following an opening of the isolation valve, and determining, from the two pressure values measured, the presence of an anomaly in the measured value for the pressure in the fuel tank.

2. The checking method as claimed in claim 1, in which the determining step involves comparing the temporal extreme value for the pressure in the purge line against a reference extreme value corresponding to the same value for the fuel tank pressure before the opening of the valve.

3. The checking method as claimed in claim 1, further comprising a preliminary step of establishing a relationship between the temporal extreme value for the pressure in the purge line after the opening of the tank isolation valve and the pressure in the tank before the opening of the valve.

4. The checking method as claimed in claim 3, in which the relationship is established by interpolation from a collection of recorded temporal extreme values for the pressure in the purge line after the opening of the isolation valve for different values of the pressure in the tank before the opening of the valve.

5. The checking method as claimed in claim 4, in which the relationship is established from at least ten readings.

6. The checking method as claimed in claim 1, in which, if a difference between the temporal extreme value for the pressure measured in the purge line and a reference extreme value for the same pressure in the fuel tank before the opening of the valve exceeds a determined tolerance threshold, then the pressure value measured in the fuel tank is determined as exhibiting an anomaly.

7. A non-transitory computer program product, including code instructions for implementing a method comprising:
    operating a pressure sensor so as to measure a value of a pressure in a fuel tank when a fuel tank isolation valve and a fuel vapor purge line purge valve are closed,
    when the purge line is placed in fluidic communication with the fuel tank by the opening of the fuel tank isolation valve, operating a sensor of pressure in the purge line so as to measure a temporal extreme value for the pressure in the purge line,
    comparing said measurements against a reference, and
    on the basis of the result of said comparison, determining whether the value for the pressure measured in the fuel tank { }exhibits an anomaly, when implemented by a processor.

8. A device for checking the measurement of pressure in a fuel tank, the checking device comprising at least one checker communicating with a sensor of pressure in the fuel tank and with a sensor of pressure in a fuel vapor purge line, wherein the checker is designed to implement the method as claimed in claim 1.

9. A motor vehicle comprising:
    a combustion engine,
    a fuel tank comprising a pressure sensor,
    a fuel vapor breather circuit comprising:
        a fuel vapor filter,
        a fuel tank isolation valve interposed between the fuel tank and the fuel vapor filter,
        a fuel vapor purge line, connected to the fuel vapor filter, downstream thereof, and comprising a sensor of pressure in the purge line, and a purge valve designed to selectively allow or prevent circulation of fluid in the purge line, and
    a checking device as claimed in claim 8.

10. The checking method as claimed in claim 2, further comprising a preliminary step of establishing a relationship between the temporal extreme value for the pressure in the purge line after the opening of the tank isolation valve and the pressure in the tank before the opening of the valve.

\* \* \* \* \*

UNITED STATES PATENT AND TRADEMARK OFFICE
CERTIFICATE OF CORRECTION

PATENT NO. : 10,767,580 B2
APPLICATION NO. : 16/311920
DATED : September 8, 2020
INVENTOR(S) : Aurélien Groussard and Thierry Collet It is certified that error appears in the above-identified patent and that said Letters Patent is hereby corrected as shown below:

In the Claims

In Column 10, Line 7, Claim 7, between "tank" and "exhibits" delete "{ }".

Signed and Sealed this
Seventeenth Day of November, 2020

Andrei Iancu
*Director of the United States Patent and Trademark Office*